United States Patent [19]

Shirakihara

[11] Patent Number: 5,511,192
[45] Date of Patent: Apr. 23, 1996

[54] METHOD AND APPARATUS FOR MANAGING THREAD PRIVATE DATA IN A PARALLEL PROCESSING COMPUTER

[75] Inventor: Toshio Shirakihara, Kanagawa, Japan

[73] Assignee: Kabushiki Kaisha Toshiba, Kawasaki, Japan

[21] Appl. No.: 983,407

[22] Filed: Nov. 30, 1992

[30] Foreign Application Priority Data

Nov. 30, 1991 [JP] Japan .................................. 3-339572
Mar. 24, 1992 [JP] Japan .................................. 4-065772

[51] Int. Cl.$^6$ .................................................. G06F 9/46
[52] U.S. Cl. ................... 395/650; 364/230.3; 364/245.7; 364/246; 364/281.4; 364/DIG. 1
[58] Field of Search ................... 395/650, 375; 364/200

[56] References Cited

U.S. PATENT DOCUMENTS

| | | | |
|---|---|---|---|
| 4,545,016 | 10/1985 | Berger ...................................... | 364/200 |
| 4,847,754 | 7/1989 | Obermarck et al. ..................... | 364/200 |
| 5,047,919 | 9/1991 | Sterling et al. ......................... | 364/200 |
| 5,109,511 | 4/1992 | Nitta et al. ............................... | 395/650 |
| 5,339,415 | 8/1994 | Strout, II et al. ........................ | 395/650 |
| 5,353,418 | 10/1994 | Nikhil et al. ............................. | 395/375 |

OTHER PUBLICATIONS

"Memory Protection Software Facility for OS/2 Shared Data Applications", IBM Technical Disclosure Bulletin, vol. 34, No. 4A, Sep. 1991, pp. 81–89.

Proceedings of the Summer of 1989 USENIX Conference, pp. 257–268, 1989, Felix S. Hsu, Daniel S. Conde, et al., "ULTRIX THREADS.".

Proceedings of the Winter 1987 USENIX Conference, pp. 84–102, 1987, Bob Beck, et al., "A Parallel Programming Process Model.".

*Primary Examiner*—Kevin A. Kriess
*Assistant Examiner*—Majid A. Banankhah
*Attorney, Agent, or Firm*—Oblon, Spivak, McClelland, Maier & Neustadt

[57] ABSTRACT

A method and an apparatus for managing thread private data in which the thread private data can be declared globally and which can deal with the change of the number of threads. The thread private data to be globally accessible from the multiple threads and to be managed separately by each one of the multiple threads are detected before the actual execution of the program, and a thread private data region for managing all the detected thread private data is allocated to the stack for each one of the multiple threads separately. Then, a pointer to specify a base address of the thread private data region with respect to the stack for each one of the multiple threads is registered separately, such that while executing one of the multiple threads, accesses to the thread private data are made by making accesses to the thread private data region in the stack for that one of the multiple threads according to the base address specified by the pointer registered for that one of the multiple threads.

20 Claims, 10 Drawing Sheets

FIG. 1
PRIOR ART

```
start()
{
    int private_data;

... = func1(& private_data);
    ... = func2(& private_data);
} func1(ptr1)
    int *ptr;
{
    ...

*ptr = X;
    ...
} func2(ptr)
    int ptr;
{
    ...
    Y = *ptr;
    ...
}
```

FIG. 2
PRIOR ART

```
int private_data[THREAD_NUM];

start()
{
    ... = func1();
    ... = func2();
} func1()
{
    private_data[THREAD_SELF] = X ;
} func2()
{
    Y=private_data[THREAD_SELF];
}
```

FIG. 5

```
201 ----▶  private int data1, data2;

func1(){
202 ----▶      data1 = X;
           } func2(){
203 ----▶      data2 = Y;
           }
```

FIG. 6

| PRIVATE DATA REGION SIZE = 8 BYTE | | ← 301 |
|---|---|---|
| PRIVATE DATA POSITIONS | | |
| DATA NAME | DATA POSITION | ← 302 |
| data 1 | 0 | |
| data 2 | 4 | |

METHOD AND APPARATUS FOR MANAGING THREAD PRIVATE DATA IN A PARALLEL PROCESSING COMPUTER

BACKGROUND OF THE INVENTION

1. Field of the Invention

The present invention relates to parallel processing in a computer using threads which share a task address space and in which each thread has a separately assigned stack, and more particularly to a method and an apparatus for managing globally declared data privately for each thread.

2. Description of the Background Art

As a model for representing parallel processing in a computer effectively, there is a model in which a usual abstraction of a process is split into two components: the task and the thread.

In this model, the task defines the static execution environment such as an address space, while the thread defines the dynamic execution environment such as a program counter.

In such a model, it is possible for any number of threads to be present simultaneously within a given single task. In other words, it is possible for multiple threads of control to be executed simultaneously by using the same data in the given task.

The use of this model employing the concepts of tasks and threads has the following advantages over the usual parallel execution of multiple processes.

(1) The communication between threads can be made at high speed because it is achieved through shared data.

(2) The thread is assigned a relatively small number of resources compared with a process, so that the overhead due to generation and termination is less for threads than for processes.

In such a model using tasks and threads, the address space is shared among the threads, so that the global data are shared by all the threads.

For example, the data used in a program written in the programming language C can be classified into two categories: global variables and auto variables. In these two categories, the global variables, which correspond to the global data to be shared among the threads in the above described model, are usually allocated in the data space as they are to be accessible from a plurality of functions, while the auto variables are usually allocated on the stacks as they are declared within a function and valid only within that function.

Now, in the multi-threaded environment in which multiple threads are present in a single task, it is necessary for each thread to support globally declared data privately. As an example of such a multi-threaded environment in which thread private data are required, a multi-threaded server will be described below.

In this example, the multi-threaded server implements an environment in which multiple threads that perform realizing the same service are present within a single task, and a plurality of service requests from a plurality of servers can be executed simultaneously. This multi-threaded server can be realized by the following program in the C programming language, for example.

```
struct msg m;
get_job( ){ receive (&m)

job( );
}
```

In this case, in order for each thread to receive the service request, each thread calls the "get_job" function first, and calls the "receive" function in the "get_job" function, and then receives the message into the variable "m". This message variable "m" is usually going to be processed by a plurality of functions, so that it is necessary to allocate this variable globally. However, under the multi-threaded environment, globally declared data are shared among the threads so that there is a possibility that the message will be destroyed in this program. For example, when a plurality of service requests arrive, the request content of these service requests are stored as the message variable "m", but this message variable "m" is shared among the threads, so that the message that arrived later will overwrite the message that arrived earlier. Therefore, there is a possibility that the message that arrived earlier will be destroyed by the message that arrive later.

For this reason, it is necessary in such a multi-threaded environment to employ a specially devised data management method for supporting global data privately an a per thread basis.

Conventionally, the following two methods have been proposed as specially devised data management methods.

(I) Method for allocating private data on stack dynamically.

In this method, thread private data are allocated on the stack by declaring data used in several functions as auto variables in a certain function that is executed by each thread. Here, however, when the allocated data are to be used in other functions than the function that declared the auto variable, it is not possible for the other functions to directly access the allocated auto variables. There arises a need for handing the address of the allocated variable as a function argument from the calling function to that called function.

An exemplary program written in the C programming language of adopting this method is shown in FIG. 1. In this program of FIG. 1, after each thread is generated, each thread starts the execution from the function "start". Moreover, in order to support the private data "private_data" for each thread, the private data are declared within the function "start" and allocated on the stack. When calling the functions "func1" and "func2" from the function "start", the private data "private_data" cannot be accessed from either "func1" or "func2", so that there is a need to pass the address of this private data from the function "start" to the functions "func1" and "func2" as a function argument.

Thus, in this conventional data management method for supporting private data for each thread, there is a need to pass the address of the private data as a function argument when calling one function from another function. Therefore, the program entry for the called function which operates on the private data must contain the argument specifying the address of the private data, and consequently the program becomes quite complicated. In addition, in the called function, there is a need to store the address of the private data on the stack. Furthermore, the access to the private data can be made only indirectly through the address, so the execution efficiency is lowered.

(II) Method for expanding variables in correspondence to multiple threads, and accessing variables by using thread IDs.

In this method, each part of the thread private data is globally declared as a global sequence having as many elements as there are threads. An access from each thread is made by using a thread ID which is uniquely assigned to each thread in advance. In this method, if the thread IDs are not supported at the OS level, it becomes necessary to support the thread IDs themselves by using the specialized method (I) described above. Moreover, even when the thread IDs are supported at the OS level, this method is not applicable to a case in which a number of threads changes dynamically.

An exemplary program written in the C programming language adopting this method is shown in FIG. 2. In this program of FIG. 2, the private data "private_data" is declared as a global sequence. A number of elements allocated to this global sequence is defined by a predetermined constant "THREAD_NUM". The access to the private data is made by using the thread ID "THREAD_SELF".

In this example, the number of elements involved in the global sequence is unchangeably fixed to "THREAD_NUM", so that there is a limit to a number of threads that can be accommodated. In addition, in order for each thread to be able to make an access to the private data, it is necessary for the thread ID "THREAD_SELF" of each thread to be supported at the OS level.

Thus, in this conventional data management method for supporting the global data privately by each thread, there is a need to provide the thread IDs. In addition, this method cannot deal with a situation involving the generation and termination of threads in which a number of threads changes dynamically. Here, there is a proposition to modify this method to be able to deal with the generation and termination of threads by utilizing a structure employing the hashing of the thread IDs, but this in turn lowers the execution efficiency considerably. Furthermore, the maximum number of threads that can be supported is limited by the number of elements defined in the global sequence in this method.

SUMMARY OF THE INVENTION

It is therefore an object of the present invention to provide a method and an apparatus for managing thread private data in which the thread private data can be declared globally without using thread IDs.

It is another object of the present invention to provide a method and an apparatus for managing thread private data which can deal with the dynamic change of the number of threads due to the generation and termination of threads.

According to one aspect of the present invention there is provided a method of managing thread private data in a computer program to be executed by using multiple threads in the address space of a single task, where each one of the multiple threads is associated with a different stack for storing the local data of said each one of the multiple threads, the method comprising the steps of: detecting the thread private data to be globally accessible from the multiple threads and to be used separately by each one of the multiple threads of the program; allocating on the stack a thread private data region for each of the threads for storing the thread private data detected in the detecting step; registering pointers to specify the respective base addresses of each of the thread private data regions with respect to the respective stacks for each one of the multiple threads; and while executing one of the multiple threads, accessing the thread private data region in the stack for said one of the multiple threads according to the base address specified by the pointer registered at the registering step for said one of the multiple threads.

According to another aspect of the present invention there is provided an apparatus for managing thread private data in a computer program to be executed by using multiple threads in the address space of a single task, where each one of the multiple threads is associated with a different stack for storing the local data of said each one of the multiple threads, the apparatus comprising: means for detecting the thread private data to be globally accessible from the multiple threads and to be used separately by each one of the multiple threads of the program; means for allocating on the stack a thread private data region for each of the threads for storing the thread private data detected by the detecting means; means for registering pointers to specify the respective base addresses of each of the thread private data regions with respect to the respective stacks for each one of the multiple threads and means for accessing the thread private data for one of the multiple threads while executing said one of the multiple threads, according to the base address specified by the pointer registered by the registering means for said one of the multiple threads.

Other features and advantages of the present invention will become apparent from the following description taken in conjunction with the accompanying drawings.

BRIEF DESCRIPTION OF THE DRAWINGS

FIG. 1 is an illustration of an exemplary program in the C programming language incorporating one conventional method for managing thread private data.

FIG. 2 is an illustration of an exemplary program in the C programming language incorporating another conventional method for managing thread private data.

FIG. 5 is an illustration of an exemplary program in the C programming language containing the private data to be managed by the apparatus of FIG. 3.

FIG. 6 is an illustration of an internal data structure to be used in a private data recognition unit in the apparatus of FIG. 3.

DETAILED DESCRIPTION OF THE PREFERRED EMBODIMENTS

Figure 3:
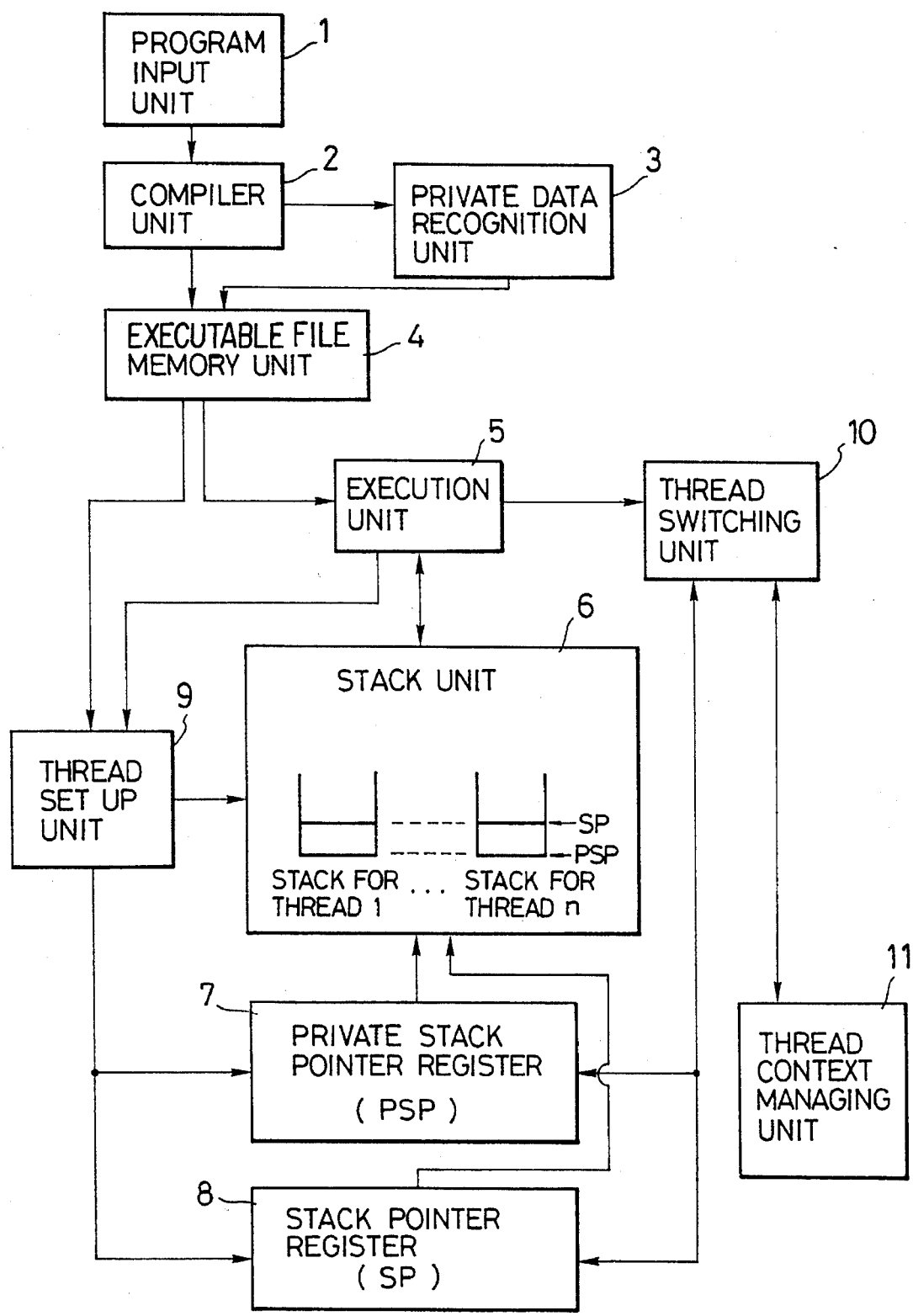
FIG. 3 is a block diagram of one embodiment of an apparatus for managing thread private data according to the present invention.

Referring now to FIG. 3, one embodiment of an apparatus for managing thread private data according to the present invention, which carries out a method for managing thread private data according to the present invention, will be described in detail.

In this embodiment, the apparatus comprises: a program input unit 1 for inputting a program to be executed; a compiler unit 2 for compiling the program inputted from the program input unit 1; a private data recognition unit 3 for recognizing all private data appearing in the program while the program is compiled at the compiler unit 2; an executable file memory unit 4 for storing an executable file obtained from the program compiled at the compiler unit 2 and analyzed in the private data recognition unit 3; an execution unit 5 for executing the executable file stored by the executable file memory unit 4; a stack unit 6 containing a stack in correspondence to each thread used in the execution at the execution unit 5; a private stack pointer (PSP) register 7 for registering the private stack pointer to indicate the base address of the private data region to be formed in each stack in the stack unit 6; a stack pointer (SP) register 8 for registering a top address of the private data region in each stack in the stack unit 6; a thread set up unit 9 for managing the stack unit 6, the private stack pointer register 7, and the stack pointer register 8 for each thread executed in the execution unit 5; a thread switching unit 10 for switching the settings of the private stack pointer register 7 and the stack pointer register 8 according to a change of a currently executed thread being executed in the execution unit 5; and a thread context managing unit 11 for managing the values stored in the private stack pointer register 7 and the stack pointer register 8 for each thread used in the execution at the execution unit 5.

In this embodiment, the private data region for storing the private data declared in the program is set up separately in each stack for each thread in the stack unit 6, such that the private data can be managed separately for each thread in the stack for each thread.

Figure 4:
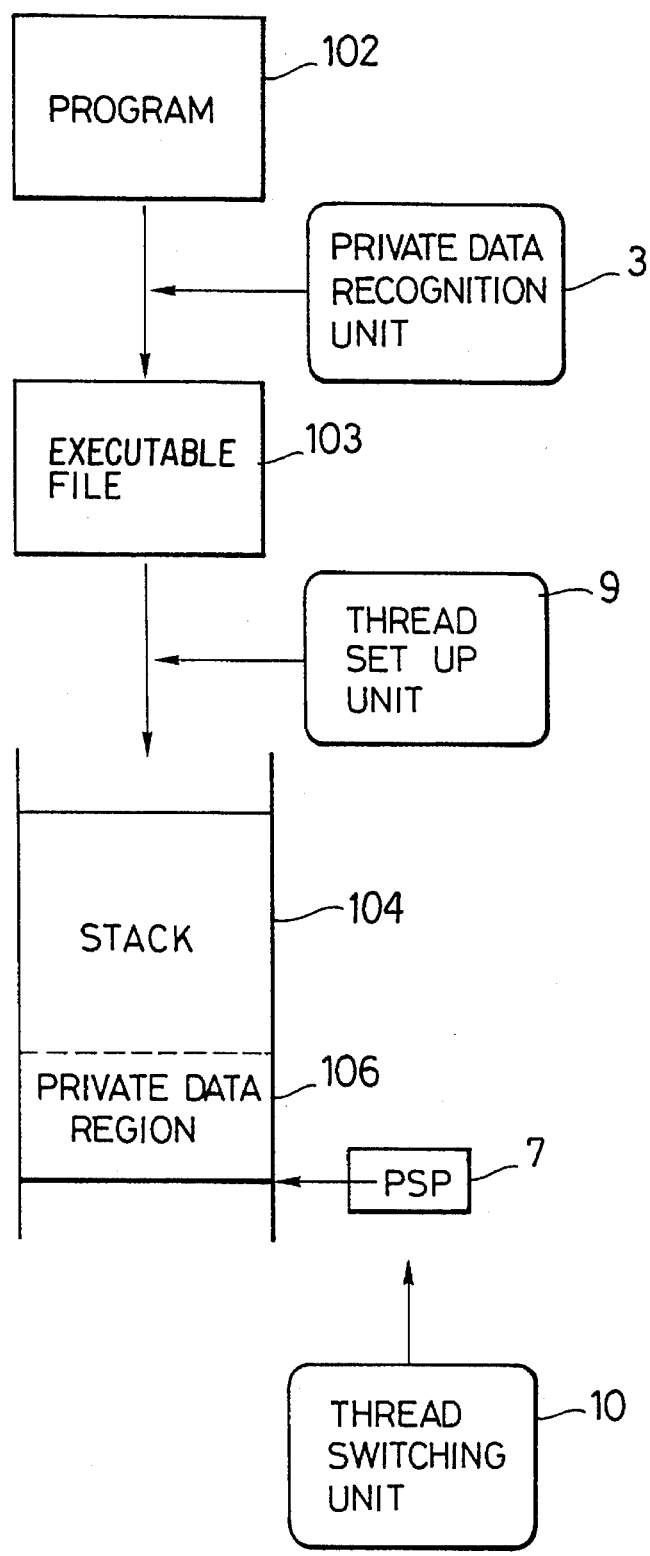
FIG. 4 is a diagram representing a major operation sequence in the apparatus of FIG. 3 schematically.

In this regard, the major operation sequence in the apparatus of FIG. 3 can be represented schematically as shown in FIG. 4. In general, the program 102 inputted from the program input unit 1 and compiled at the compiler unit 2 is checked by the private data recognition unit 3 to produce the appropriate executable file 103 in the executable file memory unit 4. Then, according to the execution of this executable file 103 at the execution unit 5, the thread set up unit 9 is operated to set up the private data region 106 within each stack in the stack unit 6 separately for each thread used in the execution. The base address of the private data region 106 is pointed to by the private stack pointer (PSP) registered in the private stack pointer register 7. Whenever the currently executed thread is to be switched from one thread to another thread, the thread switching unit 10 is operated to adjust the value of the private stack pointer (PSP) in the private stack pointer register 7.

Further detail of the operation in this apparatus of FIG. 3 will now be described.

In this apparatus of FIG. 3, while the program 102 inputted from the program input unit 1 is compiled at the compiler unit 2, the private data recognition unit 3 recognizes all private data variables appearing in the program 102 and determines the appropriate size of the private data region 106 to store the private data variables and a position (offset) of each private data variables within the private data region 106. The determined size of the private data region 106 is then recorded into a header portion of the executable file 103 in the executable file memory unit 4. The private data recognition unit 3 also generates an appropriate access instruction for accessing each private data variables according to the determined position (offset) of each private data variables. The generated access instructions are then recorded into the text executable of the executable file 103 at the executable file memory unit 4.

For example, suppose that the program 102 written in the C programming language which is compiled at the compiler unit 2 has a section as shown in FIG. 5 which contains a declaration of "data1" and "data2" as private data variables at a line 201, and functions "func1" and "func2" including access instructions for "data1" and "data2" at lines 202 and 203, respectively.

In such a case, the private data recognition unit 3 creates an internal data structure as shown in FIG. 5, which includes a private data region size indication 301 and private data position indication 302. In this example, each of the private data variables "data1" and "data2" is an integer expressed by 4 bytes, so that the private data region size indication 301 indicates 8 bytes and the private data position indication 302 indicates a position "0" and a position "4" for "data1" and "data2", respectively, as shown in FIG. 6. The determined private data region size of 8 byte is subsequently recorded into the header portion of the executable file 103 in the executable file memory unit 4.

Figure 7:
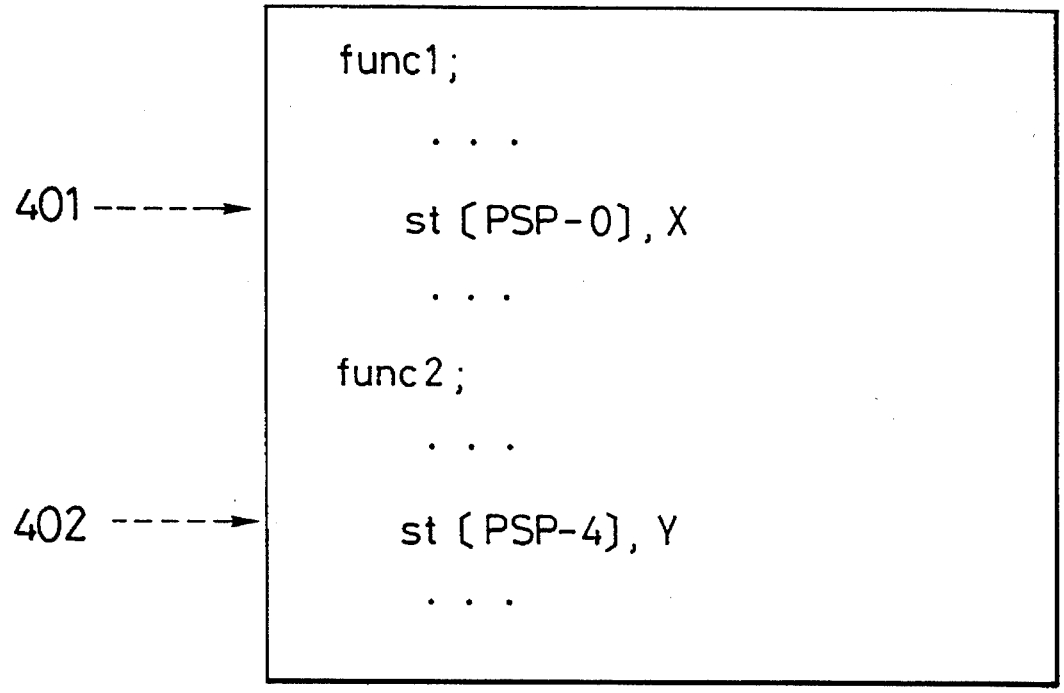
FIG. 7 is an illustration of an exemplary executable file to be used in the apparatus of FIG. 3, containing the access instructions for the private data to be managed by the apparatus of FIG. 3.

Then, the private data recognition unit 3 generates the appropriate access instructions for these private data variables "data1" and "data2", to be recorded into the text portion of the executable file 103 in the executable file memory unit 4, according to the positions (offsets) of the private data variables within the private data region 106 indicated in the private data position indication 302, as shown in FIG. 7. Namely, in FIG. 7, lines 401 and 402 containing the access instructions are inserted as part of "func1" and "func2", respectively. The access instruction at a line 401 for instance is an "st" (store) instruction for storing a variable "X" into the address specified by its argument "PSP-0", i.e., the data at an address obtained by subtracting an offset "0" from the base address of the private data region 106 in a stack 104 in the stack unit 6, which is "data1".

Figure 8:
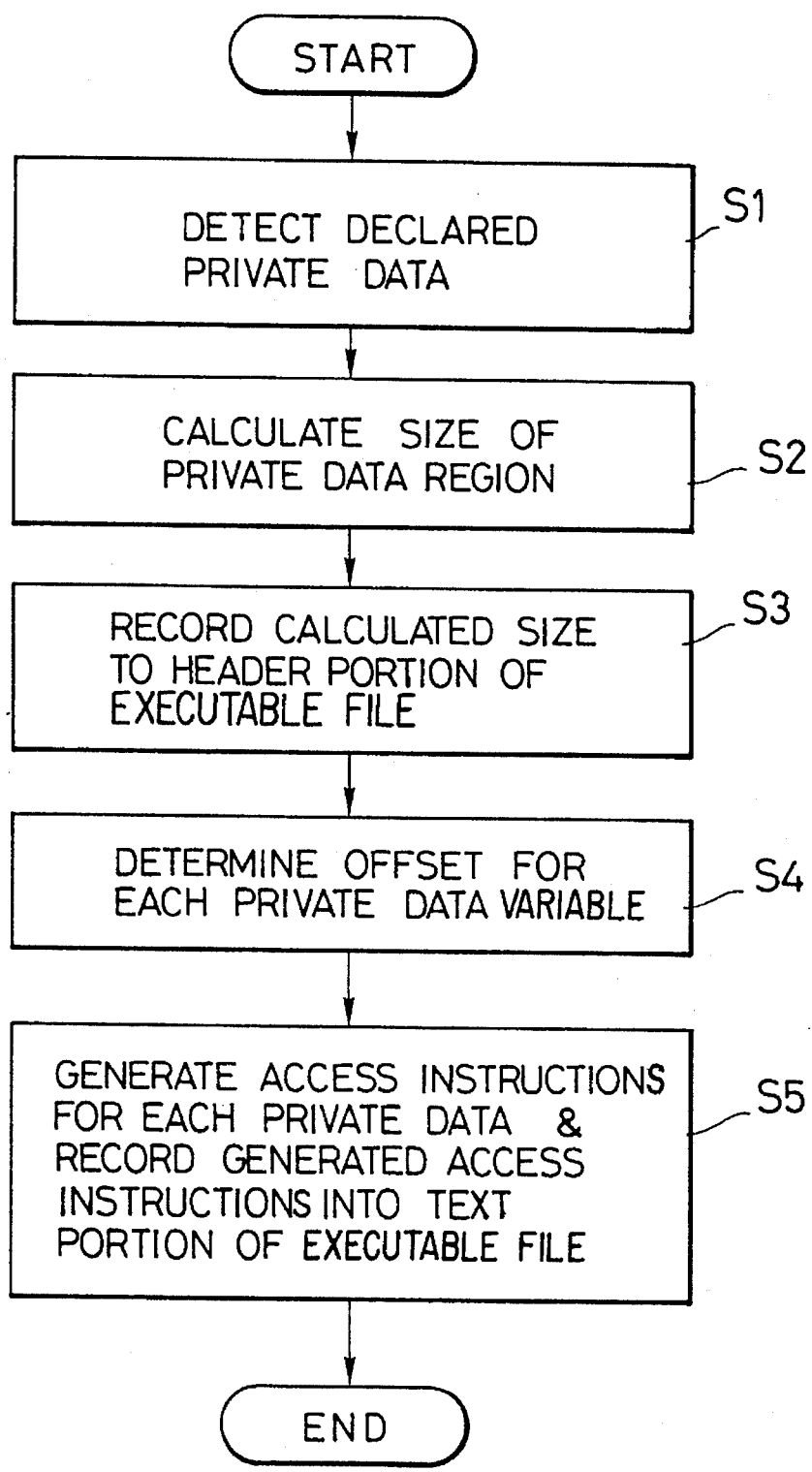
FIG. 8 is a flow chart for the operation of the private data recognition unit in the apparatus of FIG. 3.

Thus, the operation of the private data recognition unit 3 in conjunction with the preparation of the executable file 103 prior to the execution at the execution unit 5 is carried out according to the flow chart of FIG. 8, as follows.

First, at the step S1, the private data variables declared in the program 102 are detected by using the expression "private" used in the program 102 as a keyword.

Then, at the step S2, the appropriate size of the private data variables region 106 needed to store the private data detected at the step S1 is calculated.

Then, at the step S3, the appropriate size of the private data region 106 calculated at the step S2 is recorded into a header portion of the execution file 103 stored in the executable file memory unit 4.

Then, at the step S4, the offset for each private data variables, i.e., a position of each private data variable within the private data region 106 with respect to the base address of the private data region 106, is determined.

Finally, at the step S5, the appropriate access instruction for each private data variable is generated according to the offset determined at the step S4, and the generated access instructions for all the detected private data variables are recorded into the text exectable portion of the executable file 103 stored in the executable file memory unit 4.

Now, when the executable file 103 so prepared is actually executed at the execution unit 5, the threads are generated and the current thread is switched among the generated threads according to the executable file 103.

Figure 9:
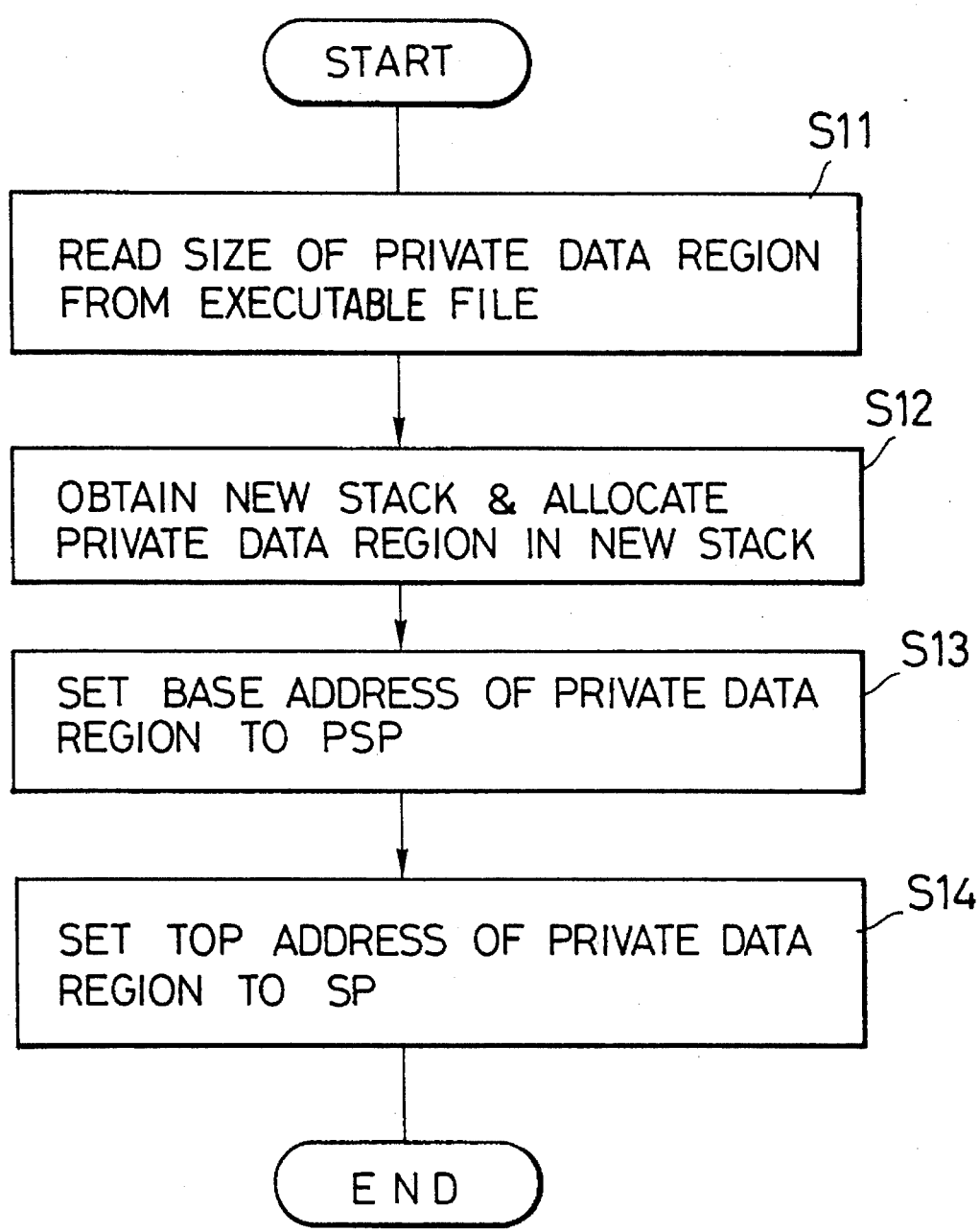
FIG. 9 is a flow chart for the operation of a thread set up unit in the apparatus of FIG. 3.

In a case of generating a new thread during the execution at the execution unit 5, the thread set up unit 9 operates according to the flow chart of FIG. 9, as follows.

First, at the step S11, the thread set up unit 9 reads the size of the private data region 106 recorded in the header portion of the executable file 103.

Then, at the step S12, the thread set up unit 9 obtains a new stack 104 for a newly generated thread in the stack unit 6, and allocates the private data region 106 of the specified size within this new stack 104 for the newly generated thread. Here, in this embodiment, the private data region 106 is to be allocated at a lowest portion of the stack 104, although it may very well be allocated anywhere else in the stack 104, if desired.

Then, at the step S13, the thread set up unit 9 sets the base address of the private data region 106 in the new stack 104 for the newly generated thread, which is equal to the base address of the new stack 104 in this case, to the private stack pointer (PSP) in the private stack pointer register 7.

Finally, at the step S14, the thread set up unit 9 sets the top address of the private data region 106 in the new stack 104 for the newly generated thread to the stack pointer (SP) in the stack pointer register 8. Here, the stack pointer (SP) may be set to any other address above the top address of the private data region 106 if desired. The remaining region in the stack 104 above the stack pointer (SP) is subsequently utilized as a usual stack for storing the local data used only in the associated thread.

Figure 10:
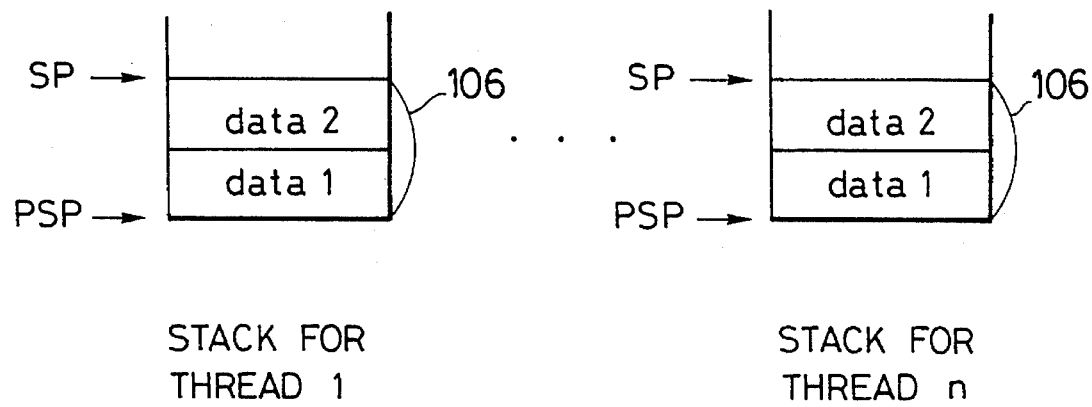
FIG. 10 is an illustration of stacks with the private data region allocated by the operation of the thread set up unit according to the flow chart of FIG. 8.

As a result of this operation by the thread set up unit 9, as shown in FIG. 10, the private data region 106 of the specified size used to store the private data "data1" and "data2" is set up in each one of the stacks for the threads 1 to n separately, with the private stack pointer (PSP) pointing to the base address of the private data region 106 while the stack pointer (SP) points to the top address of the private data region region 106.

Figure 11:
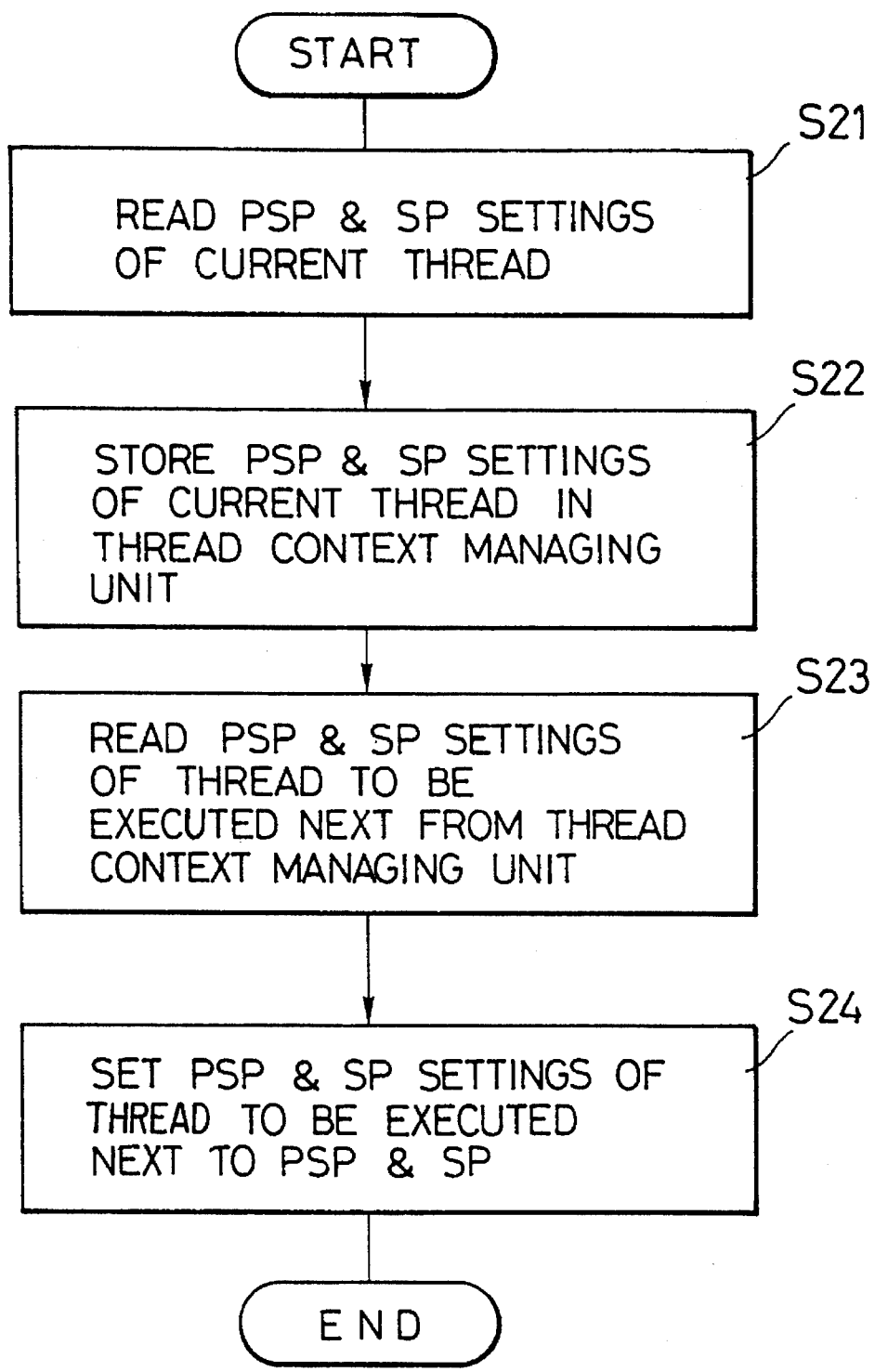
FIG. 11 is a flow chart for the operation of a thread switching unit in the apparatus of FIG. 3.

Now, when switching the current thread during execution at the execution unit 5, the thread switching unit 10 operates according to the flow chart of FIG. 11, as follows.

First, at the step S21, the thread switching unit 10 reads the values of the private stack pointer (PSP) and the stack pointer (SP) for the current thread, and then at the step S22, the thread switching unit 10 stores these values into the thread context managing unit 11. The thread context managing unit 11 stores the values of the private stack pointer register 7 and the stack pointer register 8 for each thread separately.

Then, at the step S23, the thread switching unit 10 reads the values of the private stack pointer (PSP) and the stack pointer (SP) for the next thread to be executed from the thread context managing unit 11.

Finally, at the step S24, the thread switching unit 10 sets these values for the next thread into the private stack pointer register 8 and the stack pointer register 9.

As a result of this operation by the thread switching unit 10, the private stack pointer register 8 and the stack pointer register 9 are always set with the settings of the private stack pointer (PSP) and the stack pointer (SP) for the currently executed thread.

Thus, when an access instruction, such as those shown in FIG. 7, is encountered in the execution at the execution unit 5, the access to the desired private data is made by making an access to the address obtained by subtracting the offset of the desired private data specified in the access instruction from the private stack pointer (PSP) of the current thread indicated by the private stack pointer register 8.

As described above, according to the present invention, it becomes possible to provide a method and an apparatus for managing thread private data in which the thread private data variables can be declared globally as normal global data, because the private data region is set up in each stack for each thread separately. Consequently, the program is less complicated and aids in preventing the introduction of bugs into the program.

Moreover, as each private data variables is given a fixed position with respect to the private data region, there is no need to make an indirect access by specifying the address of a variable every time the private data is to be accessed. This improves the efficiency of the program execution.

In addition, according to the present invention, it also becomes possible to provide a method and an apparatus for managing thread private data which can handle changes in number of threads of a computer program due to the dynamic generation and termination of threads, because the private data region is set up in the stack of each thread independently.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of managing thread private data in a computer, for a program to be executed by using multiple threads provided with respect to a single task defining address space, where each one of the multiple threads is associated with a different stack for managing local data of said each one of the multiple threads, the method comprising the steps of:

detecting the thread private data used in the program, the thread private data being globally accessible from the multiple threads and managed separately by each one of the multiple threads;

separately allocating a thread private data region for managing the thread private data detected at the detecting step in the stack for each one of the multiple threads;

separately registering a pointer to specify a base address of the thread private data region allocated in the stack for each one of the multiple threads, in a private stack pointer register; and making accesses to the thread private data during an execution of one of the multiple threads, by making accesses to the thread private data region in the stack for said one of the multiple threads according to the base address specified by the pointer registered in the private stack pointer register for said one of the multiple threads.

2. The method of claim 1, further comprising the steps of:

determining a data region size of the thread private data region necessary for storing all the thread private data detected in the detecting step, such that the allocating step allocates the thread private data region in the determined data region size;

deciding a position of each one of the thread private data detected at the detecting step with respect to the thread private data region in the data region size determined at the determining step; and generating an access instruction for said each one of the thread private data in terms of the base address of the thread private data region and the position decided at the deciding step.

3. The method of claim 2, further comprising the step of producing an executable file, to be used in executing the program, by recording the data region size determined at the determining step into a header portion of the executable file while recording the access instruction generated at the generating step into a text portion of the executable file.

4. The method of claim 1, further comprising the step of separately registering a top address of the thread private data region with respect to the stack for each one of the multiple threads in a stack pointer register, as a stack pointer for indicating a stack region in the stack for managing local data of said each one of the multiple threads.

5. The method of claim 1, wherein at the allocating step, the thread private data region is separately allocated in the stack for each one of the multiple threads such that the thread private data region in the stack does not overlap with a stack region in the stack for managing local data of said each one of the multiple threads.

6. The method of claim 1, further comprising the steps of:
recording the base address of the thread private data region with respect to the stack for each one of the multiple threads as a portion of a thread context for said each one of the multiple threads, for all of the multiple threads, in the computer; and
switching a thread to be executed from one of the multiple threads to another one of the multiple threads, by changing the base address specified by the pointer registered in the private stack pointer register from the base address for said one of the multiple threads to the base address for said another one of the multiple threads as recorded at the recording step.

7. An apparatus for managing thread private data in a computer, for a program to be executed by using multiple threads provided with respect to a single task defining an address space, where each one of the multiple threads is associated with a different stack for managing local data of said each one of the multiple threads, the apparatus comprising:
means for detecting the thread private data used in the program, the thread private data being globally accessible from the multiple threads and managed separately by each one of the multiple threads;
means for separately allocating a thread private data region for managing the thread private data detected by the detecting means in the stack for each one of the multiple threads;
a private stack pointer register for separately registering a pointer to specify a base address of the thread private data region allocated in the stack for each one of the multiple threads; and
means for making accesses to the thread private data while executing one of the multiple threads, by making accesses to the thread private data region in the stack for one of the multiple threads according to the base address specified by the pointer registered in the private stack pointer register for said one of the multiple threads.

8. The apparatus of claim 7, further comprising: means for determining a data region size of the thread private data region necessary for storing all the thread private data detected by the detecting means, such that the allocating means allocates the thread private data region in the determined data region size;

means for deciding a position of each one of the thread private data detected by the detecting means with respect to the thread private data region in the data region size determined by the determining means; and
means for generating an access instruction for said each one of the thread private data in terms of the base address of the thread private data region and the position decided by the deciding means.

9. The apparatus of claim 8, further comprising means for producing an execution file, to be used in executing the program, by recording the data region size determined by the determining means into a header portion of the execution file while recording the access instruction generated by the generating means into a text portion of the execution file.

10. The apparatus of claim 7, further comprising a stack pointer register for separately registering a top address of the thread private data region with respect to the stack for each one of the multiple threads, as a stack pointer for indicating a stack region in the stack for managing local data of said each one of the multiple threads.

11. The apparatus of claim 7, wherein said means for allocating separately allocates the thread private data region in the stack for each one of the multiple threads such that the thread private data region in the stack does not overlap with a stack region in the stack for managing local data of said each one of the multiple threads.

12. The apparatus of claim 7, further comprising:
means for recording the base address of the thread private data region with respect to the stack for each one of the multiple threads as a thread context for said each one of the multiple threads, for all of the multiple threads, in the computer; and
means for switching a thread to be executed from one of the multiple threads to another one of the multiple threads, by changing the base address specified by the pointer registered in the private stack pointer register from the base address for said one of the multiple threads to the base address for said another one of the multiple threads as recorded by the recording means.

13. A method of allocating and using thread private data in a computer program to be executed by using multiple threads in the address space of a single task, where each one of the multiple threads is associated with a different stack for storing the local data of said each one of the multiple threads, the method comprising the steps of:
detecting, using a first computer program, thread private data variables in a second computer program;
creating plural threads to execute said second computer program, each of said plural threads having a stack;
allocating on the stack of each of said plural threads a thread private data region for storing the thread private data variables detected in the detecting step;
storing pointers to specify respective base addresses of the allocated thread private data regions of the plural threads;
loading a private stack pointer register with the stored base address of one of said plural threads; and
accessing one of the thread private data variables of the one of said plural threads using a relative offset from the base address loaded in the private stack pointer register.

14. The method of claim 13, further comprising the step of:
determining a size, in bytes, of the thread private data region detected in the detecting step, such that the allocating step allocates the thread private data region of the determined size.

15. The method of claim 13, further comprising the steps of:

deciding an offset within the thread private data region for each of the thread private data variables detected in the detecting step; and generating at least one access instruction for a respective one of the thread private data variables in terms of the base address of the thread private data region and the offset decided in the deciding step.

16. The method of claim 15, further comprising the step of:

producing an executable file having header and executable portions by recording the size determined in the size determining step into the header portion of the executable file and recording the at least one access instruction generated in the generating step into the executable portion of the executable file.

17. The method of claim 14, further comprising the step of storing in a stack pointer register an address equal to the private stack pointer register plus the size of the determined thread private data region for storing local variables for the one of said plural threads.

18. The method of claim 13, further comprising the steps of:

switching a thread to be executed from the one of said plural threads to a second of said plural threads, by changing the base address loaded in the private stack pointer register from the base address for the one of said plural threads to the base address for the second of said plural threads.

19. A system for allocating and using thread private data in a computer program to be executed by using multiple threads in the address space of a single task, where each one of the multiple threads is associated with a different stack for storing the local data of said each one of the multiple threads, the method comprising the steps of:

means for detecting, using a first computer program, thread private data variables in a second computer program;

means for creating plural threads to execute said second computer program, each of said plural threads having a stack;

means for allocating on the stack of each of said plural threads a thread private data region for storing the thread private data variables detected in the detecting step;

means for storing pointers to specify respective base addresses of the allocated thread private data regions of the plural threads;

means for loading a private stack pointer register with the stored base address of one of said plural threads; and means for accessing one of the thread private data variables of the one of said plural threads using a relative offset from the base address loaded in the private stack pointer register.

20. The system for claim 19, further comprising the step of:

means for determining a size, in bytes, of the thread private data region detected using the means for detecting, such that the means for allocating allocates the thread private data region of the determined size.

* * * * *